US012657279B2

(12) United States Patent
Jeansonne et al.

(10) Patent No.: US 12,657,279 B2
(45) Date of Patent: Jun. 16, 2026

(54) FIRMWARE AUTHENTICATION

(71) Applicant: Hewlett-Packard Development Company, L.P., Spring, TX (US)

(72) Inventors: Jeffrey Kevin Jeansonne, Spring, TX (US); Mason Andrew Gunyuzlu, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/724,878

(22) PCT Filed: Jan. 13, 2022

(86) PCT No.: PCT/US2022/012386
§ 371 (c)(1),
(2) Date: Jun. 27, 2024

(87) PCT Pub. No.: WO2023/136829
PCT Pub. Date: Jul. 20, 2023

(65) Prior Publication Data
US 2025/0068715 A1    Feb. 27, 2025

(51) Int. Cl.
*G06F 21/44* (2013.01)
*G06F 21/57* (2013.01)

(52) U.S. Cl.
CPC ............ *G06F 21/44* (2013.01); *G06F 21/572* (2013.01); *G06F 2221/033* (2013.01)

(58) Field of Classification Search
CPC ...... G06F 21/575; G06F 21/572; G06F 21/57; G06F 21/44; G06F 21/51; G06F 21/00;

G06F 8/65; G06F 8/71; G06F 8/63; G06F 8/61; G06F 2221/033; G06F 2221/034; G06F 11/1433; G06F 11/1417;
(Continued)

(56) References Cited

U.S. PATENT DOCUMENTS 7,069,452 B1 * 6/2006 Hind ..................... G06F 21/572
713/1
10,630,478 B1    4/2020 Yavuz
(Continued)

FOREIGN PATENT DOCUMENTS

CN    109214168 A * 1/2019 ............... G06F 8/65
CN    110795126 A * 2/2020 ............... G06F 8/65
(Continued)

OTHER PUBLICATIONS

Kumar, Vinay BY, et al. "Post-quantum secure boot." 2020 Design, Automation & Test in Europe Conference & Exhibition (Date). IEEE, 2020. (Year: 2020).*

*Primary Examiner* — Michael Simitoski
(74) *Attorney, Agent, or Firm* — Quarles & Brady LLP

(57) ABSTRACT

An example computing device comprises a memory to store control instructions, and a processor to: perform a first authentication of the control instructions using a first key; and in response to receipt of a command to enable a second authentication of the control instructions, add a second key to a one-time programmable portion of the memory, wherein the command is signed using the first key, the second key to perform a second authentication of the control instructions with the first key to perform the first authentication of the control instructions.

20 Claims, 9 Drawing Sheets

(58) Field of Classification Search
CPC .... G06F 9/4401; G06F 9/4406; G06F 9/4403;
G06F 9/445
See application file for complete search history.

(56) References Cited

U.S. PATENT DOCUMENTS

| | | | | |
|---|---|---|---|---|
| 2003/0026427 | A1* | 2/2003 | Couillard | H04L 9/0825 |
| | | | | 713/189 |
| 2005/0125652 | A1* | 6/2005 | Singer | G06F 21/572 |
| | | | | 726/26 |
| 2006/0291265 | A1* | 12/2006 | Schrom | G11C 17/18 |
| | | | | 365/94 |
| 2007/0043948 | A1* | 2/2007 | Bugbee | H04L 9/3268 |
| | | | | 713/176 |
| 2007/0113102 | A1 | 5/2007 | Glen | |
| 2010/0189262 | A1 | 7/2010 | Ducharme et al. | |
| 2011/0066787 | A1 | 3/2011 | Markey et al. | |
| 2011/0142242 | A1 | 6/2011 | Tanaka | |
| 2012/0137137 | A1* | 5/2012 | Brickell | G06F 21/73 |
| | | | | 713/182 |
| 2012/0210115 | A1* | 8/2012 | Park | H04L 9/3247 |
| | | | | 713/2 |
| 2013/0111203 | A1* | 5/2013 | Baltes | H04L 9/3247 |
| | | | | 713/100 |
| 2014/0033305 | A1* | 1/2014 | Nelson | G06F 21/575 |
| | | | | 726/22 |
| 2014/0359268 | A1* | 12/2014 | Jauhiainen | G06F 21/44 |
| | | | | 713/168 |
| 2015/0058979 | A1* | 2/2015 | Peeters | G06F 21/575 |
| | | | | 726/22 |
| 2015/0186651 | A1* | 7/2015 | Kim | G06F 21/575 |
| | | | | 713/2 |
| 2016/0154744 | A1* | 6/2016 | Zheng | H04L 9/088 |
| | | | | 713/193 |
| 2016/0162669 | A1* | 6/2016 | Mikhailov | G06F 21/12 |
| | | | | 713/2 |
| 2016/0182238 | A1* | 6/2016 | Dewan | H04L 9/321 |
| | | | | 713/193 |
| 2017/0090909 | A1 | 3/2017 | Guo et al. | |
| 2017/0177373 | A1* | 6/2017 | Jeansonne | G06F 9/4403 |
| 2017/0180139 | A1* | 6/2017 | Jeansonne | H04L 9/3236 |
| 2017/0244568 | A1* | 8/2017 | Brickell | H04W 12/041 |
| 2017/0272250 | A1 | 9/2017 | Kaliski, Jr. | |
| 2018/0088927 | A1* | 3/2018 | Zhao | H04L 9/0643 |
| 2018/0109377 | A1 | 4/2018 | Fu | |
| 2019/0065750 | A1* | 2/2019 | Bolan | G06F 21/64 |
| 2019/0166117 | A1* | 5/2019 | Kumar | H04L 9/30 |
| 2019/0207756 | A1 | 7/2019 | Vass et al. | |
| 2019/0213359 | A1* | 7/2019 | Kepa | G06F 21/73 |
| 2020/0097658 | A1* | 3/2020 | Samuel | G06F 11/0793 |
| 2020/0104221 | A1* | 4/2020 | Kost | G11C 29/52 |
| 2020/0177757 | A1* | 6/2020 | Ono | H04N 1/00899 |
| 2020/0184077 | A1* | 6/2020 | Venkataraman | G06F 21/575 |
| 2020/0374130 | A1* | 11/2020 | Strong | H04L 9/0894 |
| 2021/0240567 | A1* | 8/2021 | Hsu | G06F 13/4282 |
| 2021/0377049 | A1* | 12/2021 | Nix | H04L 9/0877 |
| 2021/0389958 | A1* | 12/2021 | Choi | G06F 9/4416 |
| 2022/0067166 | A1* | 3/2022 | Kwon | G06F 21/572 |
| 2022/0198018 | A1* | 6/2022 | Wentz | H04L 9/3268 |
| 2022/0353061 | A1* | 11/2022 | Pala | H04L 9/0825 |
| 2022/0382872 | A1* | 12/2022 | Sakib | H04L 9/3247 |
| 2022/0405392 | A1* | 12/2022 | Nix | H04L 9/3249 |
| 2023/0122962 | A1* | 4/2023 | Liu | H04L 9/3242 |
| | | | | 713/171 |
| 2023/0327885 | A1* | 10/2023 | Griffin | G06F 21/602 |
| | | | | 713/164 |
| 2024/0152284 | A1* | 5/2024 | Lee | H04L 9/0662 |
| 2024/0267211 | A1* | 8/2024 | Shingala | G06F 21/72 |

FOREIGN PATENT DOCUMENTS

| | | | | | | |
|---|---|---|---|---|---|---|
| CN | 114003915 | A | * | 2/2022 | | G06F 21/575 |
| JP | 2021092848 | A | * | 6/2021 | | |
| WO | WO-2021262161 | A1 | * | 12/2021 | | G06F 21/64 |

* cited by examiner

FIRMWARE AUTHENTICATION

BACKGROUND

Computer code (e.g. software, firmware, and drivers) may be considered to be trusted or untrusted. Some untrusted code may cause or allow unwanted changes to take place to trusted code (e.g. in the Basic Input/Output System (BIOS)). Authenticating trusted code prior to executing it can mitigate against problems caused by running unauthorised and potentially malicious modifications which may have been made to the trusted code.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

Figure 3A:
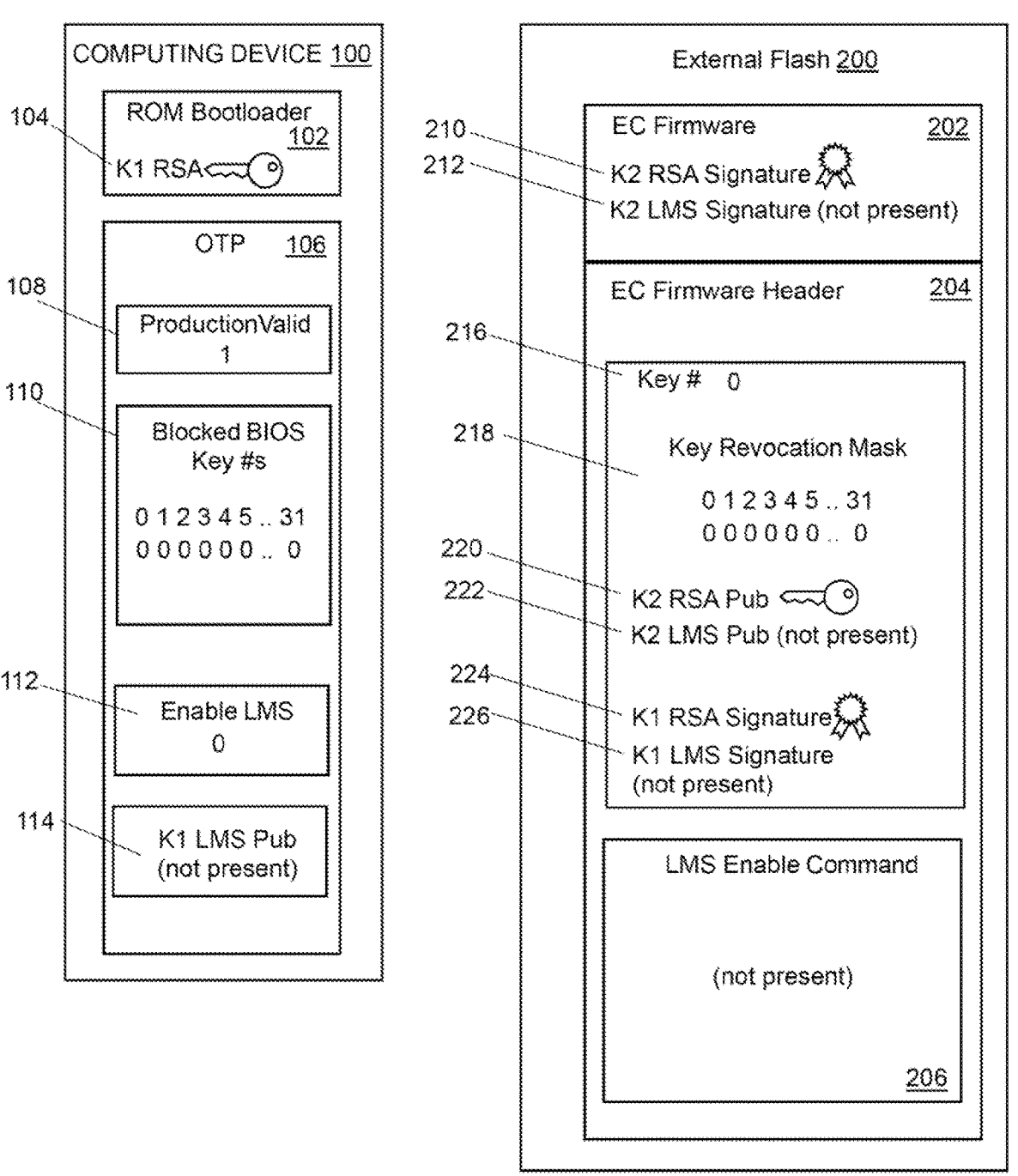
Figure 3B:
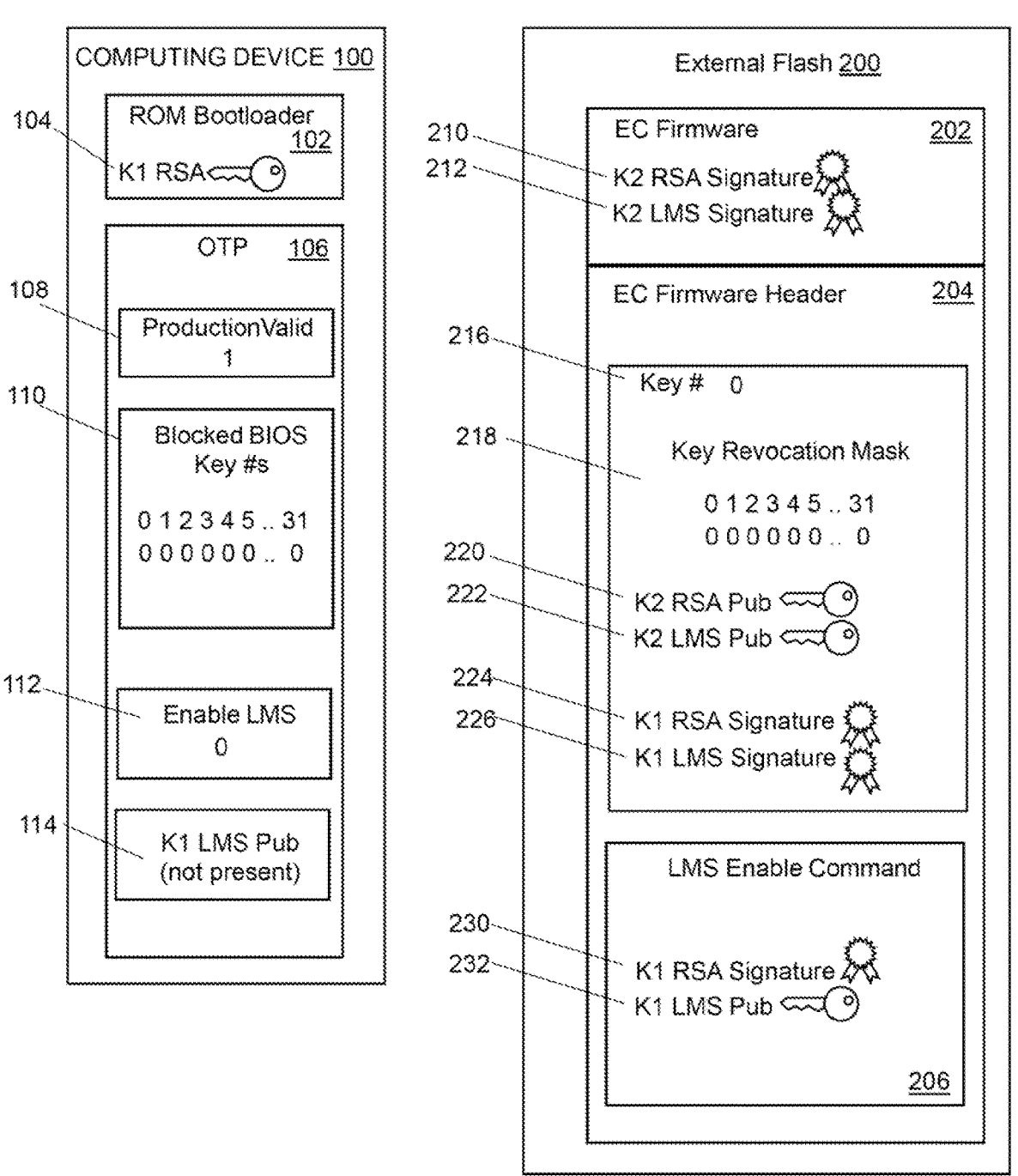
Figure 3C:
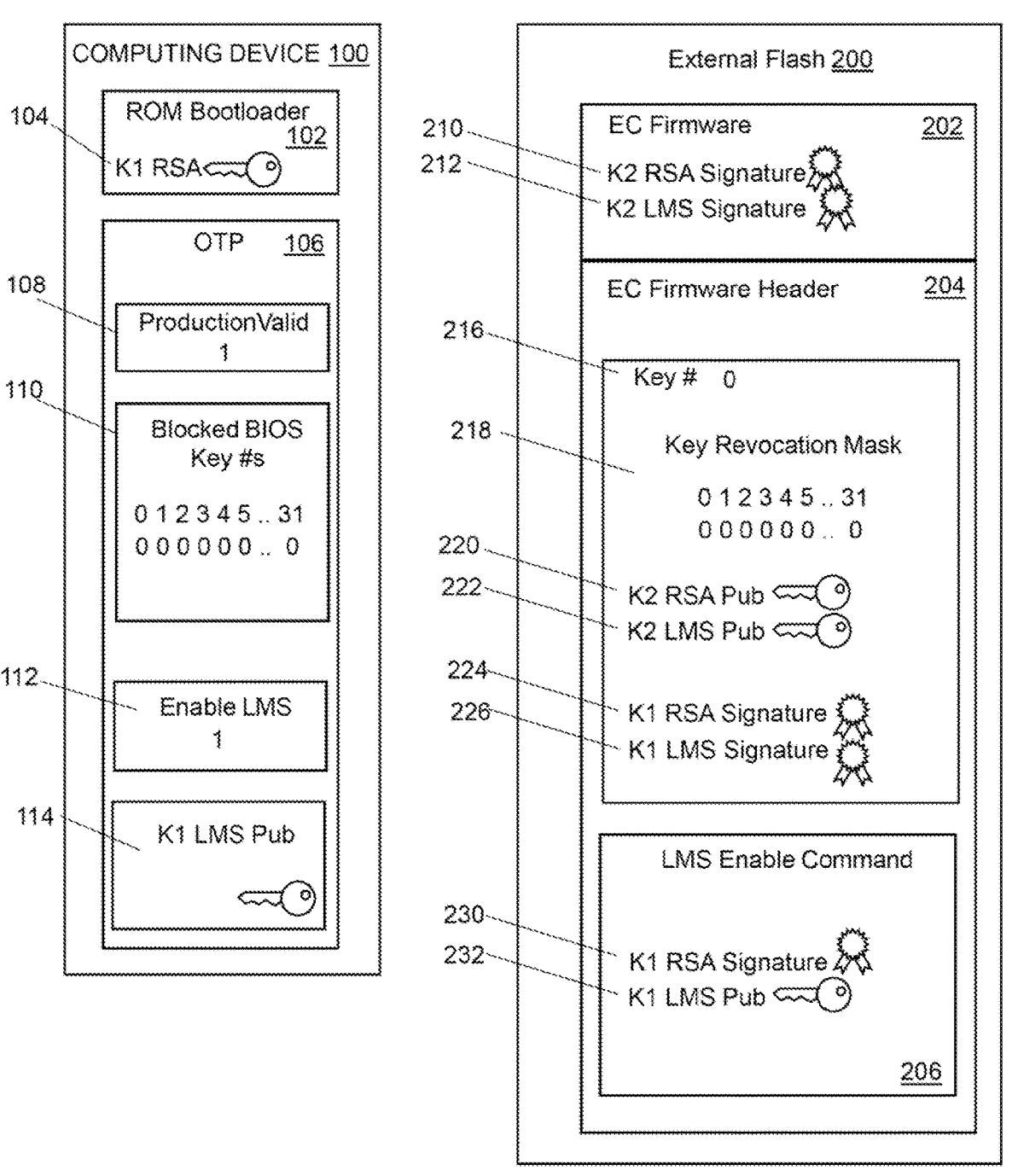
Figure 4A:
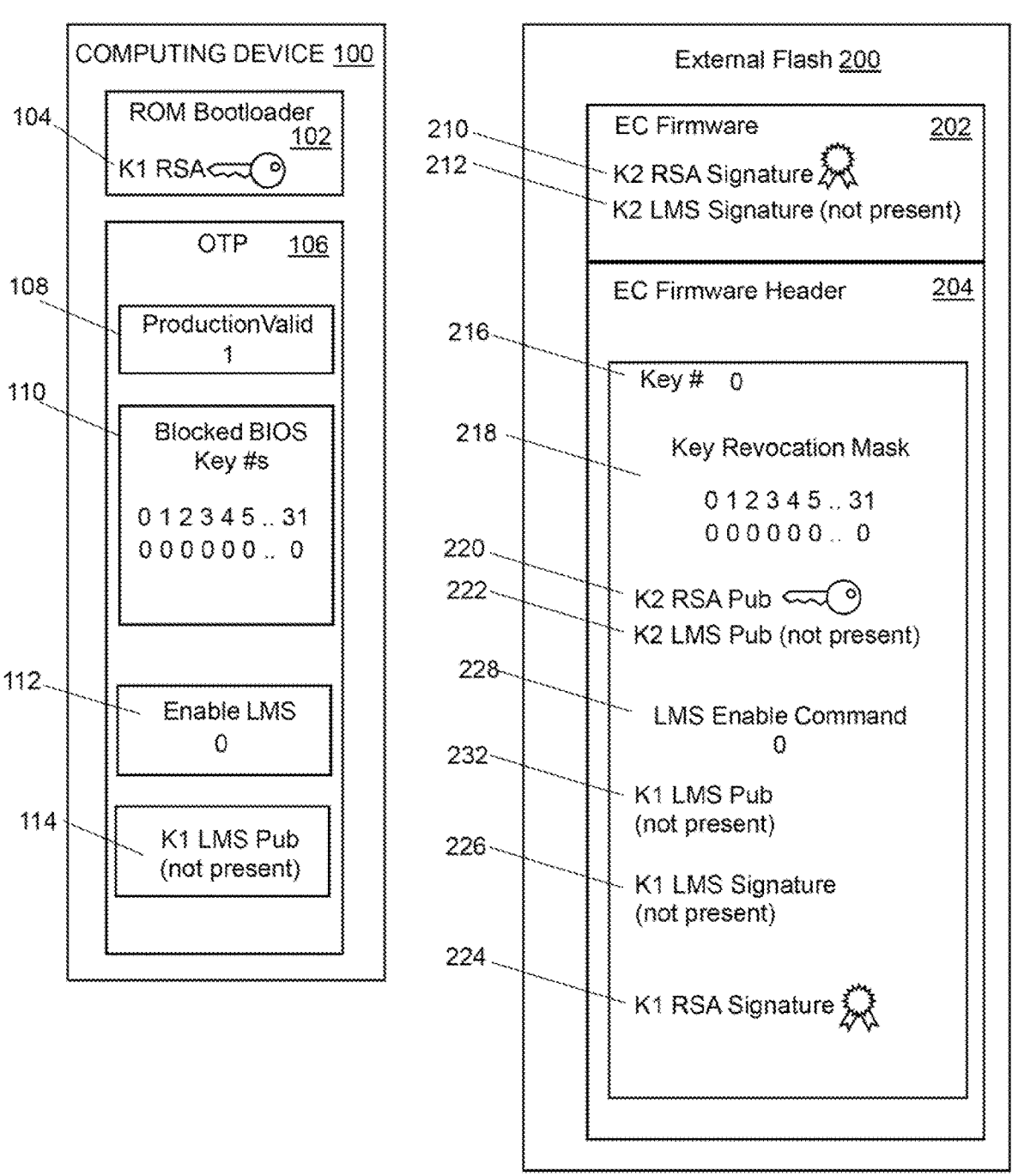
Figure 4B:
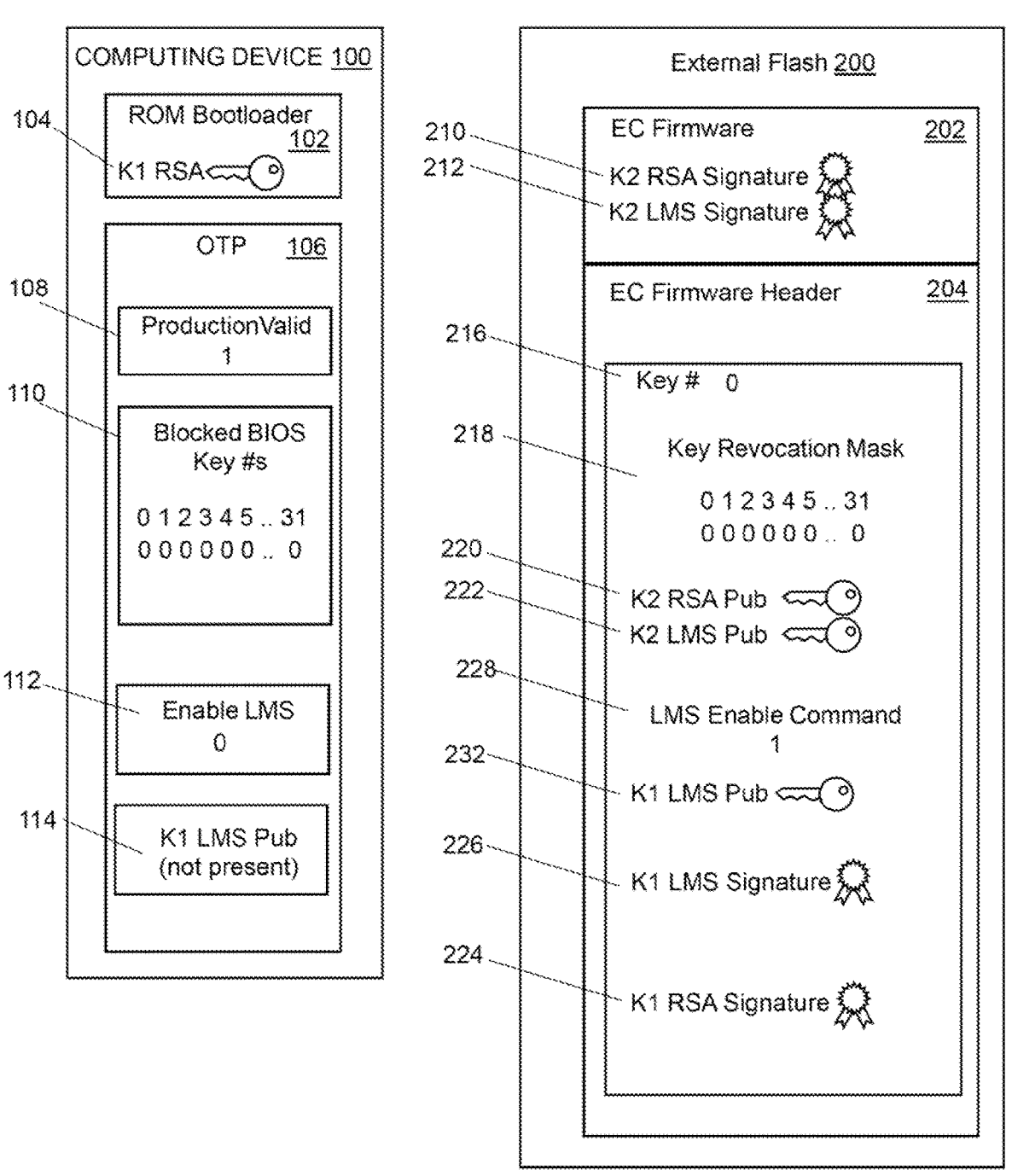
Figure 4C:
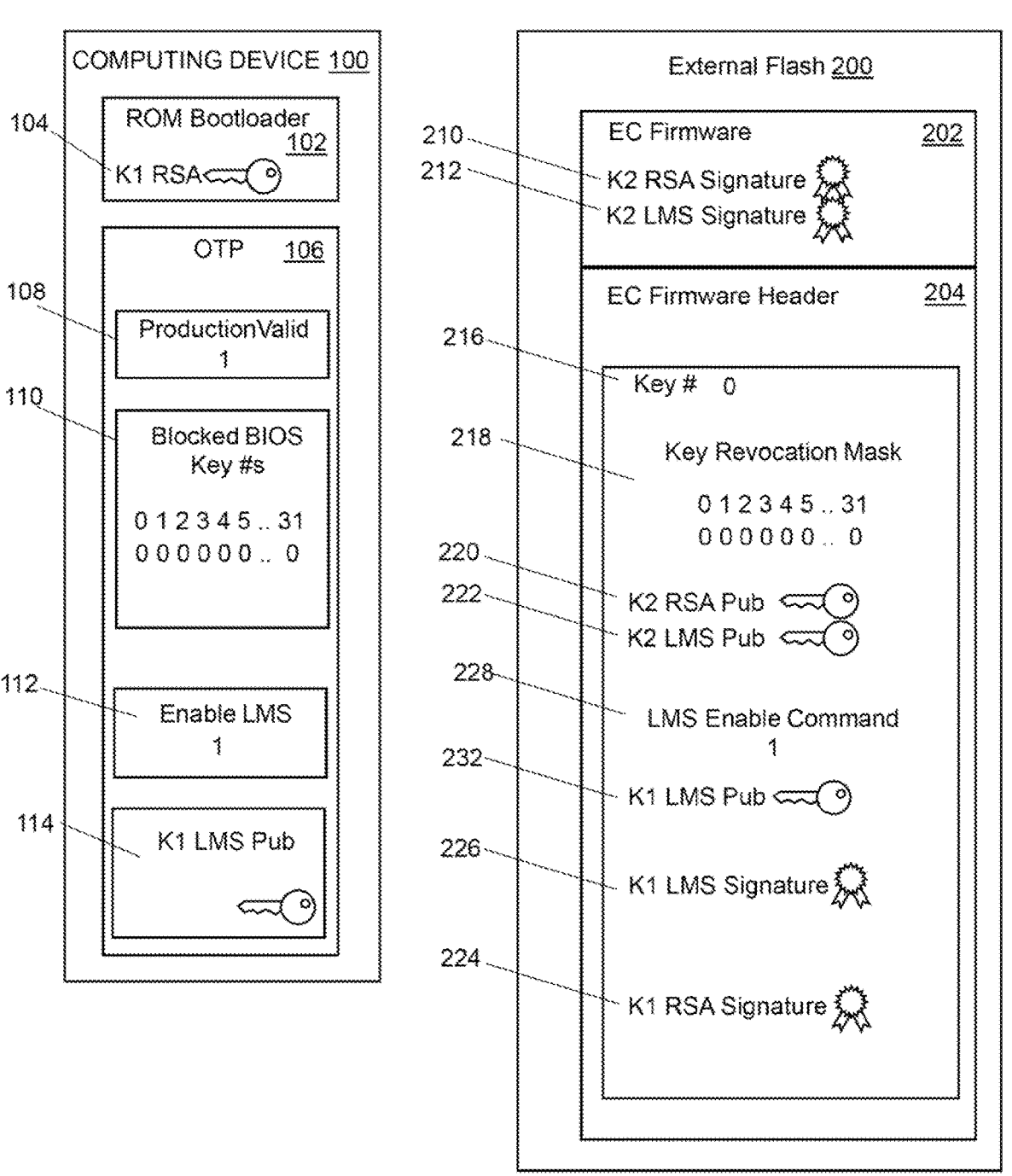
Figure 5:
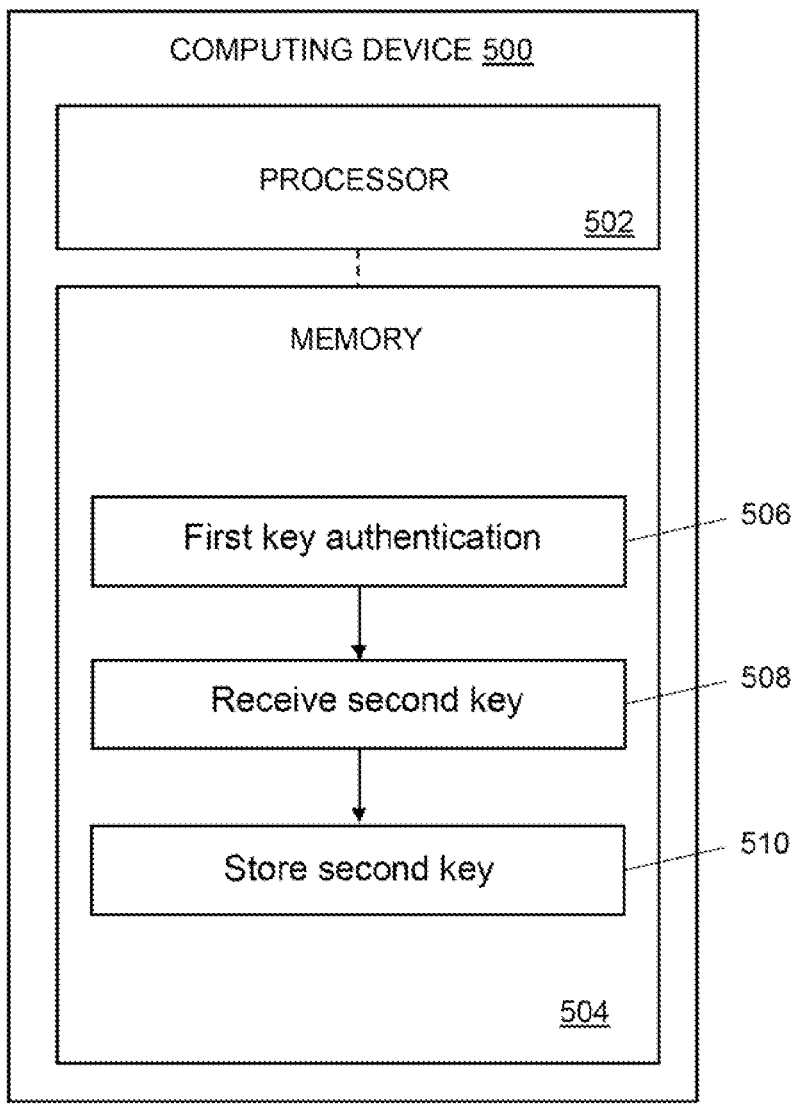

FIGS. 3a-3c show a schematic representation of an example computing device and an example external memory to provide first and second authentication of control instructions in the computing device, the second authentication enabled in the computing device following an update provided by the external memory, the update comprising an enable function to verify the second authentication prior to providing the update, according to an example of the disclosure;

FIGS. 4a-4c show a schematic representation of an example computing device and an example external memory to provide first and second authentication of a control instructions in the computing device, the second authentication enabled in the computing device following an update provided by the computing to the computing device, the update comprising an enable function to verify the second authentication as part of the update code header from the computing device, according to an example of the disclosure; and FIG. 5 shows an exemplary logical workflow in a computing device, which may be carried out by computer-readable instructions run on a processor, to provide for first and second authentication of control instructions in the device by verifying update instructions to write the second authentication key to the device memory, according to examples of the disclosure.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Examples disclosed herein relate to authenticating update instructions (e.g. provided as a firmware update) as trusted instructions before writing to memory (e.g. writing a cryptographic key for verifying signatures) according to the update instructions. Authentication of update instructions may be performed using a cryptographic signature scheme, such as using Rivest-Shamir-Adleman (RSA) or Elliptic Curve Cryptography (ECC) digital signatures to verify that a source of update instructions to be written to memory is a trusted source.

However, it is likely that quantum computing will advance to the point that it can be used to defeat large-key-size RSA and ECC digital signatures. This is especially critical for Root of Trust (RoT) hardware designs that rely on a trusted immutable internal component that is responsible for authenticating external (untrusted) firmware, such as update instructions, before loading/executing it.

The immutable portion of the RoT hardware may typically implement a specific cryptographic algorithm to perform update instruction authentication that is not able to be modified in the field. Such cryptographic algorithms may have a long lifespan, and as such there is a growing risk over time that they will still be in use within products that are still supported when it becomes feasible for an attacker to use quantum-computing based methods to crack the private key of the cryptographic algorithm, and thus have the ability to create malicious firmware appearing as update instructions that the RoT would authenticate.

Example BIOS devices, such as example Read-Only Memory (ROM) bootloaders, are devices in which the update instruction authentication mechanism may be implemented in ROM and may not be able to be changed in the field (i.e. once the device is deployed from the manufacturers). Such devices may also be present in products that are supported by the manufacturer for up to ten years or more following deployment. This means there may be products in the field that may be not be "quantum-safe" (i.e. resilient to quantum-computing based malicious attacks).

Examples disclosed herein describe a hardware design that enable crypto-agility (i.e. the functionality to be able to update the cryptographic signing capabilities once the device is deployed) for a RoT device. The RoT device may use an integrated immutable portion that is then responsible for authenticating external update instructions prior to loading/executing them. This solution may be achieved by providing a mechanism to optionally phase in one or more quantum-safe algorithms for the device when such algorithms are ready for use, without any changes being needed to the design of the RoT device itself. Such mechanisms may even be used to deploy an update to devices that are in the field, to add quantum secure firmware authentication by a secure second quantum-safe signing protocol, after they have shipped to the end user.

As used herein, a Basic Input/Output System (BIOS) refers to hardware or hardware and instructions to initialize, control, or operate a computing device prior to execution of an Operating System (OS) of the computing device. Instructions within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware computing devices or platform firmware of the computing device and an OS of the computing device, via which the OS of the computing device may control or operate hardware computing devices or platform firmware of the computing device. In some examples, a BIOS may implement the Unified Extensible Firmware Interface (UEFI) specification or another specification or standard for initializing, controlling, or operating a computing device.

Examples disclosed herein provide a computing device, comprising: a memory to store control instructions; and a processor to: perform a first authentication of the control instructions using a first key; and in response to receipt of a command to enable a second authentication of the control instructions, add a second key to a one-time programmable portion of the memory, wherein the command is signed using the first key, the second key to perform a second authentication of the control instructions with the first key to perform the first authentication of the control instructions.

Examples disclosed herein provide a computing device, comprising: a memory and a processor to: store control instructions from an external memory into the memory; validate the control instructions using a first key; and execute the validated control instructions to enable the computing device to obtain a second key; wherein the first key is to provide a first authentication of the control instructions with the second key to provide a second authentication of control instructions.

Examples disclosed herein provide a non-transitory computer-readable medium comprising instructions that, when executed, cause a processor of a computing device to: authenticate, using a first key, control instructions to be run in a memory of the computing device; receive, from a trusted source, an indication of a second key to be stored in the memory; and immutably store the second key in the memory, wherein the first and second keys are to authenticate the control instructions to be run in a memory of the computing device according to respective first and second cryptographic protocols.

Examples discussed herein in terms of a computing device to behave in a described way also encompass a non-transitory computer-readable medium comprising instructions that, when executed, cause a processor of a computing device to behave in the way described. Examples discussed herein in terms of a non-transitory computer-readable medium comprising instructions that, when executed, cause a processor of a computing device to behave in a described way may also be taken to encompass a computing device to behave in the described way. Such instructions may also be considered to encompass computer implemented methods to perform the described features.

As disclosed herein, the terms software and firmware may be considered to be interchangeable in the context of the examples provided. "Firmware" may be considered to be code or processor executable instructions that runs before OS execution, with a small portion which continues after OS bootloader executes (for example during a callback procedure). Examples discussed here refer to the provision of update instructions which may be considered to be firmware or a firmware update. "Software" may be considered to be a broader term than firmware, and may be considered to refer to code or processor executable instructions that executes from the time the OS bootloader starts, through OS runtime, and until the computing device is shut down. Examples discussed here refer to the provision of update instructions which may be considered to be software or a software update. The term "control instructions" as used in this description may be taken to mean firmware, firmware instructions, or BIOS instructions in some examples.

Examples disclosed herein may apply to ROT devices. The quantum-safe cryptographic algorithm(s) used for signing may comprise one or more quantum-safe algorithm candidates, for example algorithms which are still in the process of standardization/vetting.

Figure 1:
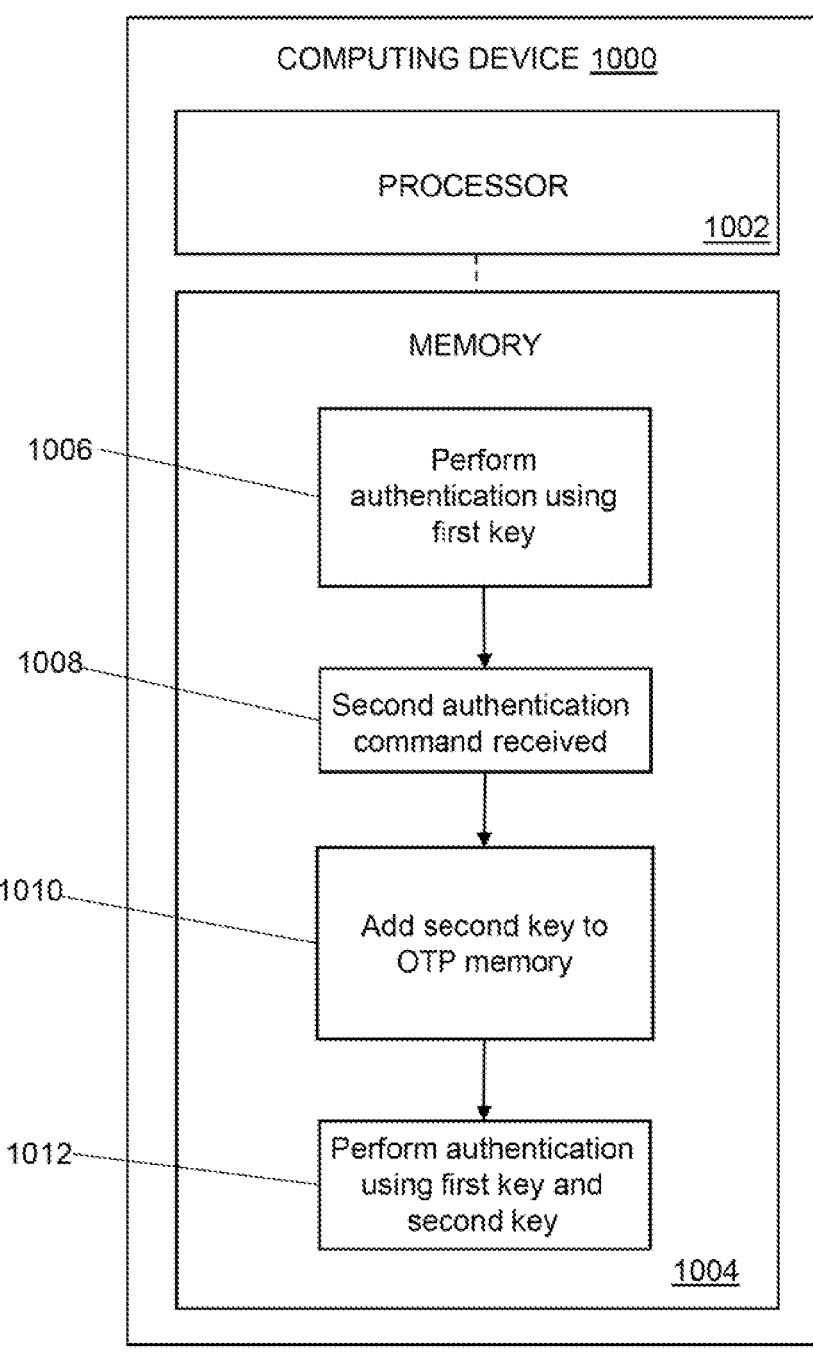
FIG. 1 shows a schematic representation of an example computing device to authenticate instructions to write a key to the device memory, according to an example of the disclosure.

FIG. 1 shows a schematic representation of a computing device 1000. The computing device 1000 comprises a memory 1004 which is to store control instructions (e.g. firmware) and in some examples is to store further computer readable instructions. The memory 1004 may, for example, comprise firmware (e.g. BIOS, or Unified Extensible Firmware Interface, UEFI) and a set of instructions/software to cause the computing device to operate may be stored in the firmware. In some examples, the memory 1004 may comprise data, programs, software, or code, and a set of instructions/software to cause the computing device to operate may be stored in the data, programs, software, or code, not limited to firmware.

The computing device 1000 also comprises a processor 1002. The processor 1002 is to perform a first authentication of the control instructions using a first key in step 1006. For example, the processor 1002 may use a first signature verification to determine that the control instructions are authentic and may run safely. Such a first signature verification may be a public key cryptosystem such as comprise RSA (Rivest-Shamir-Adleman) encryption, for example. In a public-key cryptosystem, the encryption key is public and distinct from the decryption key, which is kept secret (private). An RSA user creates and publishes a public key based on two large prime numbers, along with an auxiliary value. The prime numbers are kept secret. Messages can be encrypted by anyone, via the public key, but can be decoded by someone who knows the prime numbers.

RSA encryption may be used for signing a message to demonstrate its authenticity and trusted nature. The private key of the key pair may be used to encrypt a message which may be decrypted by anyone, but which can be encrypted by one person; this provides the digital signature. By using RSA to sign a message or other file the computing device 1000 can determine the message is trusted i.e. from a trusted party, and thus not malicious. The control instructions are signed using the private key by producing some hash value from the control instructions and associating the hash value with the control instructions. The computing device 1000 can use the same hash algorithm in conjunction with the public key and compare the resulting hash with that associated with the control instructions, and if they match, the control instructions can be trusted because they signature was prepared using the private RSA key and the control instructions have not been tampered with since being authorised and the private key issued.

In response to receipt of a command to enable a second authentication of the control instructions, in step 1008, the computing device 1000 is to add a second key to a one-time programmable (OTP) portion of the memory in step 1010. The command is signed using the first key. In some examples the control instructions (e.g. as a firmware update) to be authenticated may be received from an external memory. (e.g. an external memory device, such as flash memory/external flash).

In some examples, the computing device 1000 may comprise an update flag in the OTP memory portion. When the update flag is set to a first value (e.g. zero), the computing device 1000 is to perform the first authentication of the control instructions using the first key (i.e. and not any further key). In response to verifying the second authentication using at least the first key, the computing device 1000 may set the update flag to a second value (e.g. one). Once the update flag is set to the second value, the computing device 1000 may enable receipt of the command in step 1008, to enable the second authentication of the control instructions in response to the update flag being set to the second value. Then, the device may add the second key to the OTP portion of the memory in step 1010, so that both first and second authentication of the control instructions may then be performed. In some examples, the computing device 1000 may be to authenticate more than the control instructions. For example, it may first validate a header with other keys inside, then multiple different device firmware, and then finally validate control instructions.

The computing device 1000 may be to, when the update flag of the one-time programmable portion of the memory is set to the first value, block write access to the memory 1004. In response to verifying the second authentication, the computing device 1000 may be to allow write access to the memory to allow the second key to be added to the one-time programmable portion of the memory. In this way the memory 1004 is protected and the second key may be written to the memory 1004 following verification that the second authentication is trusted, by way of the signature made using the first key. When a programmable electronic device starts up, it may have full access to all resources and may begin executing program code from an immutable read only memory. This program code is considered to be trusted as it is assumed that it cannot be updated, changed or tampered with. In some examples discussed herein, the initial authentication and enablement of the second authentication is performed in an early phase of device start-up, when the program code is assumed to be trusted, before loading any further code from a further (e.g. reprogrammable) device. If the second authentication is not being enabled, the immutable ROM code may lock the OTP memory 106 resource (i.e. prevent write access to the OTP memory 106) before loading code from an external (e.g. reprogrammable) memory 200 to help ensure, at runtime, the OTP memory 106 is protected against firmware program code which may be buggy and/or compromised/malicious.

The memory 1004 may comprise a ROM bootloader portion of the memory to store the first key and the control instructions. The memory 1004 may comprise a one-time programmable portion of the memory to store the second key.

The second key may be used to perform a second signature verification according to a second protocol. The second protocol may be a so-called "quantum safe" protocol, such as LMS (Leighton-Micali Signatures) encryption. In some examples, the control instructions stored in the ROM bootloader may be considered to comprise authentication instructions comprising second protocol algorithm(s) such as post-quantum cryptography algorithm(s). LMS is an example of a stateful hash-based cryptography, and an example of post-quantum cryptography. Hash-based signature schemes combine a one-time signature scheme with a Merkle tree structure (because a one-time signature scheme key can sign a single message securely and then it has been used up, so many such keys are combined in a single, larger tree structure). Other post-quantum cryptographic schemes which may be used to perform second signature verification are XMSS (extended Merkle Signature Scheme) and BPQS (blockchained post quantum signatures) schemes. Other post-quantum cryptographic schemes which may be used to perform second signature verification may include CRYSTALS-DILITHIUM, FALCON, GeMSS, LUOV, MQDSS, Picnic, qTESLA, Rainbow, and SPHINCS+.

The second key is to perform a second authentication of the control instructions with the first key to perform the first authentication of the control instructions in step 1012. That is, once the second key is immutably added to the OTP memory portion, authentication of the control instructions is performed using the first key and associated first signing process, and using the second key and associated second signing process. The second key may be used for associating a second signature with the control instructions and performing a second authentication similarly to the use of the first key to perform the first authentication. However, the second key is provided for inclusion in the device as part of an updating process, which causes the second key to be included in the computing device 100 at a later time to the inclusion of the first key in the computing device 100.

The second algorithm used to perform the second authentication process may be present in the memory 1004 (e.g. in the ROM code) of the computing device 1000 prior to despatching the computing device 1000 from the manufacturer to the field in some examples. However, the second authentication algorithm may not be enabled on shipping the computing device 1000, and the enablement to use the second authentication process is triggered once the computing device 1000 is in the field by the process outlined above. In such an example, the second algorithm is known at the time of shipping the computing device 1000, but it is not necessary to have a production grade signing service that generates the production keys (and protects the private keys portion) at the time of shipping. The production grade signing service may be enabled later by way of including the second key in the memory 1004. The second key may be a one-time signing key (e.g. an LMS signature) selected from a plurality of possible one-time signing keys of a hash-based signature scheme.

In other words, by default, the computing device 1000 may perform a first authentication scheme (which may be vulnerable to quantum computing algorithms) to authenticate the control instructions without any further authentication. Such verification may use an existing secure signing infrastructure (for example, RSA verification). However, the computing device 1000 has the ability to also perform a further authentication at a later time (e.g. an LMS hash-based signature verification or other quantum-safe verification process). Deployment of the further authentication may take place based on the state of a one-time-programmable policy fuse (which is disabled by default but may be enabled at later date). This fuse (when set) provides an "additive" authentication mechanism, in that the computing device 1000 still performs the original secure authentication method, and also uses the further authentication, before successfully authenticating the target control instructions and allowing the target control instructions to be written to the computing device 100 memory. Such a fuse may be referred to as an "Enable" fuse.

Because the production public key (the second key) for the further authentication mechanism may not be available in time to include it in ROM on deployment of the computing device 1000, the production public key is added to a one-time-programmable (fused) memory which is programmed before the Enable fuse is set. This may be referred to as a "Key" fuse.

To eliminate the risk of erroneously writing the update to the computing device 100 memory, for example due to a PDOS attack or accidental modification, write access to the Key and Enable fuses may be restricted. Write access may be achieved by enabling access when the computing device 1000 is reset. This results in the ROM getting execution control. The ROM code is responsible for checking for the presence of a command to set the Key and Enable fuses, validation of the command using the first authentication mechanism public key, programming the fuses correctly, and disabling write access to the Key and Enable memory locations before passing execution control to the update provision instructions. This is discussed in the examples illustrated in FIGS. 3a-3c and FIGS. 4a-4c and discussed in more detailed examples below.

Thus, the computing device 1000 is the entity that can program the second authentication key and enable second control instruction authentication, and it will do this when it receives a command to enable writing of the further authentication key to the memory 1004. That command includes the key and is signed with the first authentication public key that is used by default by the computing device to validate updates. As an additional safety measure, the ROM may find an optional second authentication mechanism signature which is populated for the target authentication update code, and successfully validates it against the second key in the Enable command before committing the key to computing device 1000 as a second key. This additional safety measure is discussed in relation to Figured 3a-3c and 4a-4c using first and second checking keys.

Note that the proposed OTP memory setting control is additive to a shipping default ROM authentication policy, meaning that control instruction authentication is made more secure by including the second key, and the second key addition may not be able to be undone once enabled.

Figure 2:
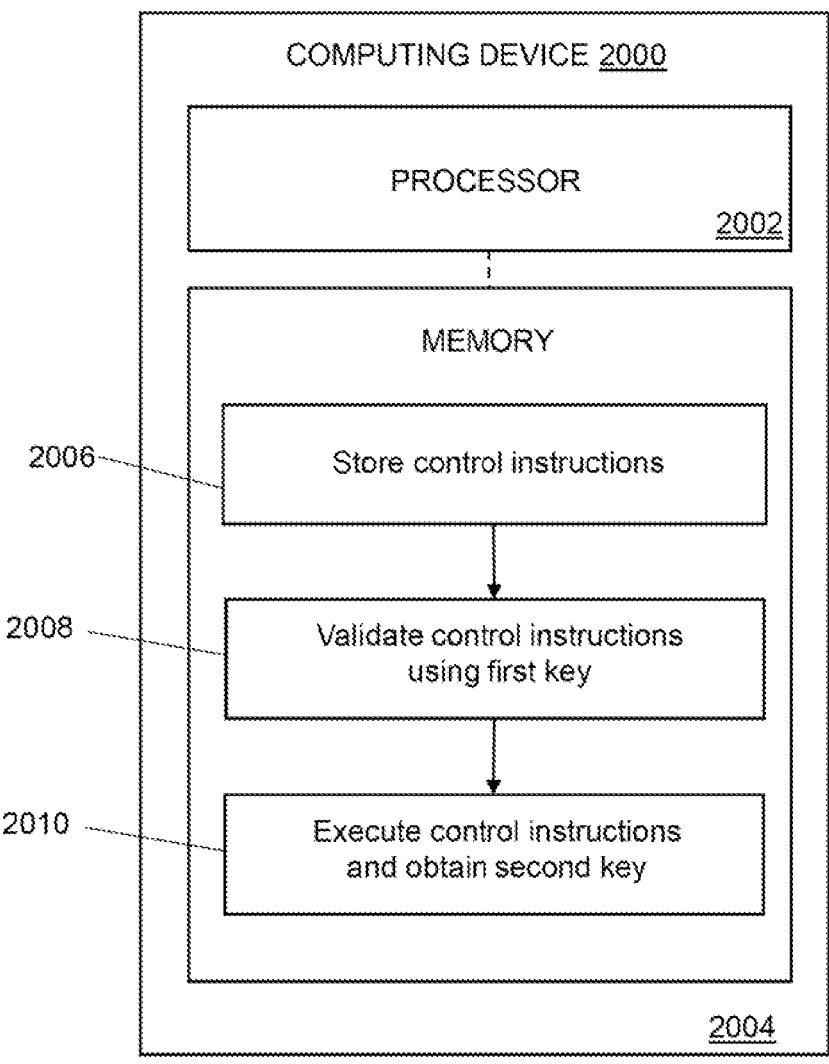
FIG. 2 illustrates a schematic representation of an example computing device to provide instructions to write a key to the device memory from an external memory once the instructions are authenticated, according to an example of the disclosure.

FIG. 2 illustrates a schematic representation of a computing device 2000. The computing device 2000 may comprise an external memory, such as flash memory/external flash/flash drive, for example. The computing device 2000 comprises a memory 2004 and a processor 2002. The processor 2002 is to store control instructions in step 2006 from an external memory (e.g. a flash memory) into the memory 2004 (e.g. into a random access memory (RAM) or static RAM (SRAM) portion of memory). The processor 2002 is to validate the control instructions using a first key (e.g. an RSA key) in step 2008. The processor 2002 is to execute the validated control instructions to enable the computing device to obtain a second key in step 2010. The first key is to provide a first authentication of the control instructions with the second key to provide a second authentication of control instructions. Thus the control instructions may be authenticated in two ways, e.g. via an RSA signature and an LMS signature for example.

In some examples, the control instructions from the external memory may cause the computing device 2000 to store second authentication code. The second authentication code is to perform the second authentication of the control instructions stored in the memory 2004 of the computing device 2000. The second authentication code enables an update to the computing device 2000 to take place, by allowing the second key to be written to the OTP memory 2004 of the computing device 2000. The second authentication code may be considered to be update code, or firmware update code, which allows the operation of the computing device 2000 to be updated by including the second key for second control instruction authentication along with the original first key control instruction authentication.

The second authentication code may comprise a header. The header may comprise: the second key; a first checking key; and a second checking key. The computing device 2000 may be to verify the second authentication code by verifying a first key checking signature of the second authentication code using the first checking key and verifying a second key checking signature of the second authentication code using the second checking key, prior to executing the validated control instructions in step 2008 to enable the computing device 2000 to obtain the second key. The first and second checking keys may therefore be used to ensure that the second key is correct before it is immutably written to the memory 2004 of the computing device 2000.

The first checking key may be to verify the second authentication code using a first verification protocol (e.g. RSA) of the first key, and the second checking key may be to verify the second authentication code using a second verification protocol (e.g. LMS) of the second key. The computing device 2000 may be to sign the second authentication code using a first signature generated using the first checking key and a second signature generated using the second checking key. The first and second signatures may be to verify the validity of the second authentication code prior to executing the validated control instructions in step 2008 to enable the computing device to obtain the second key.

FIGS. 3a-3c show a schematic representation of a computing device 100 such as the computing device 1000 of FIG. 1 or computing device 2000 of FIG. 2, and an external memory 200 such as flash memory. The computing device 100, with the external memory 200, are to provide first and second authentication of an "update" process, which is to include the second key in the memory 106 of the computing device 100 provided by the external memory 200. This example comprises an enable command function 206 to verify the second authentication. While the figures indicate an example of "EC firmware" having an "EC firmware header", "EC firmware" may be considered to be an example of firmware 202 (e.g. compute device firmware) or update authentication instructions having a firmware header 204, and need not necessarily be considered to be firmware and need not necessarily be "EC" code. The Figures also indicate an LMS Enable command which is an example of an enable command function 206.

The approach described here is illustrated in FIGS. 3a-3c as using RSA based signatures as the default signature algorithm (first key), but the concept is applicable to any other cryptographic signing algorithm. The approach described here is also illustrated in FIGS. 3a-3c as using LMS hash based signatures as the quantum-safe signing protocol (the second key), but the concept is applicable to one or even multiple (in the same design) other second algorithms such as quantum-safe algorithms candidates, for example those which are moving through the standardization/vetting process.

The computing device 100 comprises a ROM bootloader 102 and a one-time programmable (OTP) memory 106. The ROM bootloader 102 has stored within a first key 104 (e.g. an RSA key). The OTP memory 106 comprises a "Production Valid" flag 108, a Blocked BIOS Key Number register 110, an Enable LMS flag (which is an example if an update flag 112) and is to store a second key 114 (e.g. an LMS key).

The external memory 200 may comprise or may be an external flash memory device external to the computing device 100. The external memory 200 in this example comprises EC (embedded controller) firmware (e.g. a "data blob") as an example of firmware 202 which provides update authorisation instructions, an EC firmware header as an example of a firmware header 204, and an LMS Enable command as an example of an enable command function 206.

The firmware 202 is to store a first checking signature 210 (e.g. the K2 RSA signature is an implementation of the first checking signature 210) and a second checking signature 212 (e.g. K2 LMS signature is an implementation of the second checking signature 212). The firmware header 204 in this example is also shown as comprising a Key Number counter 216 and a Key Revocation Mask register 218. The firmware 202 may have multiple keys stored in memory, and there is the ability to enable and disable various keys using the Key Number counter 216 in the firmware header 204. The Key Revocation Mask register 218 may be used to revoke a key, for example in the event that the private key is somehow made available to an unauthorised party or if a hardware security module (HSM) containing the private key failed, for example.

The firmware header 204 is to store a first checking key 220 (e.g. the K2 RSA public key is an implementation of the first checking key 220) and a second checking key 222 (e.g. the K2 LMS public key is an implementation of the second checking key 222). The firmware header 204 is further to store a first signature 224 (e.g. the K1 RSA signature is an implementation of the first signature 224) and a second signature 226 (e.g. the K1 LMS signature is an implementation of the second signature 226). The LMS Enable command is to store a first signature 230 (e.g. the K1 RSA signature is an implementation of a first signature 230) and the second key 232 (e.g. the K1 LMS public key is an implementation of a second key 232).

The data stored on the external memory 200 may be loaded into a memory of the computing device 100, such as RAM or SRAM of the computing device 100, and processed by the processor of the computing device 100. In FIG. 3*a*, the first key 104 at the computing device 100 is used to sign the firmware header 204 from the external memory 200 with a first signature 224. In this example, the first checking key 220 is then used to sign the firmware 202 with a first checking signature 210 and, since the firmware 202 includes the first checking signature 210, it is considered to be authentic by the computing device 100 and may be installed in the computing device 100. The Enable LMS flag (as an update flag 112) in the computing device 100 is set to 0 (zero) and so there is no further signature authentication performed at this stage (that is, there is no second authentication mechanism enabled). Hence, there is no second key 114 present at the computing device 100 at this stage. That is, the computing device 100 is to perform a first authentication of the control instructions, located and loaded into ROM by the ROM bootloader 102 using a first key 104.

In FIG. 3*b*, the LMS Enable Command includes the second key 232 in the firmware image. The firmware header 204 included in the firmware image includes the first checking key 220 and the second checking key 222. The firmware 202 comprises the first checking signature 210 and the second checking signature 212, provided by signing using the first checking key 220 and the second checking key 222 respectively, which are both included in the firmware header 204.

The computing device 100 can determine that the "Enable LMS" flag (i.e. an update flag 112) is not set (i.e. it is set to 0 (zero)). The computing device 100 then determines the LMS Enable command is in the target firmware 202 and validates the LMS Enable command 206 using the first key 104. The computing device 100 has therefore effectively validated the firmware header 204 using the first key 104, evidenced by the first signature 230 in the LMS Enable command, and validated the firmware header 204 using the second key 232 (i.e. the second key 232 obtained from the LMS Enable command). Next, the verification of the firmware 202 is performed using the first checking key 220 from the firmware header 204 (to provide a first checking signature 210 in the firmware 202) and the second checking key 222 from the firmware header 204 (to provide a second checking signature 212 in the firmware 202).

Now, the computing device 100 can determine that the firmware 202 has been doubly verified using the first signing mechanism (via the first key 104, first signature 230, first checking key 220 and first checking signature 210) and the second signature mechanism (via the second checking key 222 and second checking signature 212). In response the computing device 100 can set the Enable flag (as an update flag 112) to 1 (one) to allow the second key 232 from the LMS Enable command to be added, or fuses, in the fuseable memory 106 in the computing device 100, as indicated by the second key 114 in the OTP memory 106. This write action is immutable so the second key 114 remains, along with the first key 104, for use in future authentication of control instructions.

As shown in FIG. 3*c*, when the external memory 200 is to add the firmware update by providing the update authorisation instructions (i.e. the firmware 202) to the computing device 100 and writing the second key 114 to the memory 106, the computing device 100 can detect that the Enable flag (as the update flag 112) is set to 1 (one) so it skips a check for the LMS Enable command (this has already been performed once). The firmware header 204 is verified by the computing device 100 using the first and second keys 104, 114 to check the first and second signatures 224, 226 in the firmware header 204. The computing device 100 verifies the update authorisation instructions using the first checking key 220 from the firmware header 204 and also using the second checking key 222 from the firmware header 204 with the first and second checking signatures 210, 212 on the firmware 202. The computing device 100 can then safely pass control to the external memory 200 so the update authorisation instructions can run and allow the firmware (i.e. the second key 114) to be written to the memory 106 of the computing device 100.

That is, the computing device 100 can respond to receipt of a command (causing the Enable flag (as the update flag 112) to be set to 1) to enable a second authentication of the control instructions by adding a second key 114 (in this example the second key 114 is the K1 LMS key) to a one-time programmable portion of the memory 106. The command is signed using the first key 104 to ensure that the second key 114 is trusted. The second key 114 is to perform a second authentication (using LMS in this example) of the control instructions with the first key 104 to perform the first authentication of the control instructions (using RSA in this example). Therefore the control instructions are verified using two signing protocols corresponding to the first key 104 and second key 114

When the update flag 112 (here, shown as the LMS Enable flag) of the one-time programmable portion of the memory 106 is set to a first value (zero), the computing device 100 performs the first (e.g. RSA) authentication of the control instructions using the first key 104. However, at a later stage, the computing device 100 can use first (e.g. RSA) and second (e.g. LMS) authentication protocols. In response to verifying the second authentication using at least the first key 104, the device sets the update flag 112 to a second value (one), and enables receipt of the enable command function 206 to enable the second authentication of the control instructions in response to the update flag being set to the second value. The computing device 100 can then add the second key 114 to the one-time programmable portion of the memory 106.

For safety, to allow write access to the OTP portion of the memory 106 when strictly necessary to add the second key 114, the computing device 100 may block write access to the OTP memory 106 when the update flag 112 of the one-time programmable portion of the memory 106 is set to the first value (zero). In response to verifying the second authentication, the computing device 100 may allow write access to the OTP memory 106 to allow the second key 114 to be added to the one-time programmable portion of the memory 106

Once the second key 114 is written to OTP memory 106, the first key 104 may be used to provide a first authentication of the control instructions, with the second key 114 which may be used to provide a second authentication of control instructions, of the computing device 100.

The firmware header 204 may be considered to store second authentication code, by way of the update authorisation instructions, which is to, by way of verifying the validity of the second key 232 before writing it to the OTP memory 106 of the computing device 100, perform second authentication of the control instructions stored in the memory of the external computing device 100. The second authentication code comprises a firmware header 204, and the firmware header 204 comprises the second key 232, the first checking key 220 and the second checking key 222. The computing device 100 is to verify the second authentication code by verifying a first checking signature 210 of the second authentication code using the first checking key 220 and verifying a second checking signature 212 of the second authentication code using the second checking key 222 prior to executing the validated control instructions to enable the computing device to obtain the second key. The first checking key 220 is to verify the second authentication code using a first verification protocol (e.g. RSA) of the first key 104, and the second checking key 222 is to verify the second authentication code using a second verification protocol (e.g. LMS) of the second key 232. The computing device 100 is to sign the second authentication code using the first checking signature 210 generated using the first checking key 220 and the second checking signature 212 generated using the second checking key 222. The first and second checking signatures 210, 212 verify the validity of the second authentication code prior to executing the validated control instructions to enable the computing device to obtain the second key (and thereby allowing the second key 114 to be stored in the memory 106).

FIGS. 4a-4c show a schematic representation of a computing device 100 and an external memory 200 to provide authentication, using a first checking signature 210 and a second checking signature 212, of a firmware 202 update provided by the external memory 200 to the computing device 100. The firmware update comprises writing a second key 114 (shown in this example as K1 LMS Pub (public) key 114) to the memory 106 of the computing device 100.

This example includes an enable command function 206 (LMS Enable command in this example) within the firmware header 204 of the external memory 200 to verify the second authentication. While the figures again indicate an example of "EC firmware" as an example of firmware 202 which provides update authorisation instructions, having an "EC firmware header" as an example of a firmware header 204, "EC firmware" may be considered to be an example of update authentication instructions having a firmware header 204, and need not necessarily be considered to be firmware and need not necessarily be "EC" code.

The approach described here uses RSA based signatures as the default signature algorithm associated with the first key 104, but the concept is applicable to any other cryptographic signing algorithm. The approach described here also uses LMS hash based signatures as the quantum-safe algorithm associated with the second key 114, but the concept is applicable to one or even multiple (in same design) other quantum-safe algorithms candidates.

The computing device 100 comprises a ROM bootloader 102 and a one-time programmable (OTP) memory 106. The ROM bootloader 102 has stored within a first key 104 (e.g. an RSA key). The OTP memory 106 comprises a "Production Valid" flag 108, a Blocked BIOS Key Number register 110, an Enable LMS flag (as an update flag 112) and is to store a second key 114 (e.g. an LMS key).

The external memory 200 comprises firmware 202, and a firmware header 204. The firmware 202 is to store a first checking signature 210 (e.g. an RSA signature) and a second checking signature 212 (e.g. an LMS signature). The firmware header 204 comprises a Key Number counter 216, a Key Revocation Mask register 218, and a second key Enable Command tag 228. The firmware header 204 is to store a first checking key 220 (e.g. an RSA key) and a second checking key 222 (e.g. an LMS key). The firmware header 204 is further to store a first signature 230 (e.g. an RSA key), a second key 232 (e.g. the LMS key), and a second signature 226 (e.g. an LMS signature).

In FIG. 4a, the first key 104 at the computing device 100 is used to sign the firmware header 204 from the external memory 200 with a first signature 224. In this example, the first checking key 220 is then used to sign the firmware 202 (i.e. the update instructions to add the second key to the memory 106) with a first checking signature 210 which may be provided to the computing device 100. Since the firmware 202 includes the first checking signature 210, it is considered to be authentic by the computing device 100 and may be installed in the computing device 100. The Enable LMS flag (as an update flag 112) in the computing device 100 is set to 0 (zero) and so there is no further signature authentication performed at this stage (that is, there is no second authentication mechanism enabled); hence, there is no second key 114 present at the computing device 100.

In FIG. 4b, the Enable Command 228 (shown as "LMS Enable command" in this example) includes the second key 232 in the firmware 202 image (i.e. as part of the update authorisation instructions). The second key 232 can be a public key. The firmware header 204 included in the firmware 202 image (i.e. also as part of the update authorisation instructions) includes the first checking key 220 and the second checking key 222. The firmware 202 comprises the first checking signature 210 and the second checking signature 212, provided by signing using the first checking key 220 and the second checking key 222 respectively, which are both included in the firmware header 204.

The computing device 100 can determine that the "Enable" fuse (update flag 112) is not set (i.e. it is set to 0 (zero)). The computing device 100 then determines the Enable command 228 in the target firmware 202 and validates the Enable command 228 using the first key 104. The computing device 100 has therefore effectively validated the firmware header 204 using the first key 104, evidenced by the first signature 224, and validated the firmware header 204 using the second key 232 (the second key 232 obtained from the enable command function 206). Next, the verification of the firmware 202 (i.e. the update authorisation instructions) is performed using the first checking key 220 from the firmware header 204 (to provide a first checking signature 210 in the firmware 202) and the second checking key 222 from the firmware header 204 (to provide a second checking signature 212 in the firmware 202).

Now, the computing device 100 can determine that the firmware 202 has been doubly verified using the first signing mechanism (via the first key 104, first signature 224, first checking key 220 and first checking signature 210) and the second signature mechanism (via the second checking key 222 and second checking signature 212). In response the computing device 100 can set the LMS Enable flag (as an update flag 112) to 1 (one) and allow the fusing of the second key 232 from the enable command function 206 to fuseable memory 106 in the computing device 100, as indicated by the second key 114 in the OTP memory 106. This write action is immutable so the second key 114 remains, along with the first key 104, in the memory 106 for use in authentication of control instructions.

This fusing process is shown in FIG. 4c, when the external memory 200 is to provide the firmware update (i.e. provide the update instructions to allow the second key 114 to be added to the OTP memory 106 of the computing device 100). The computing device 100 can detect that the Enable flag (the update flag 112) is set to 1 (one) so it skips a check for the enable command function 206 at the external memory 200 (because this has already been performed once). The firmware header 204 is verified by the computing device 100 using the first key 104 and second key 232 to check the first signature 224 and second signature 226 in the firmware header 204. The computing device 100 verifies the firmware 202 using the first checking key 220 from the firmware header 204 and also using the second checking key 222 from the firmware header 204 from the first checking signature 210 and second checking signature 212 in the firmware 202. The computing device 100 may then safely pass control to the external memory 200 so the update authorisation instructions/firmware 202 can cause the update to take place and the second key 114 can be written to the computing device 100 OTP memory 106 by the device 100 as a firmware update. In some examples, the code from the external memory 200 may be present in a memory of the computing device (such as a RAM) and the computing device 100 writes the second signature 226 to the OTP memory 106 from the RAM in a similar way to how the Enable LMS Flag 112 is controlled by the computing device 100.

In summary of FIGS. 3a-c and FIGS. 4a-c, the ROM computing device 100 is the entity that can program the second authentication key 114 and enable second control instruction authentication, and it will do this when it receives a command to enable writing of the second authentication key 114 to the OTP memory 106. That command includes the second key 114 and is signed with the first key (104 (which acts as a first authentication public key 104) that is used by default by the computing device 100 to validate updates. Thus the device 100 can trust the command to write the second key 114 to memory 106 because it is signed with the first key 104. As an additional safety measure, the ROM bootloader 102 finds an optional second authentication mechanism signature, namely, the second signature 226, which is populated for the target firmware header 204, and successfully validates it against the second key 232 in the enable command function 206 before committing the second key 114 to the memory 106 of the computing device 100, which fuses and sets the Enable fuse (as an example of an update flag 112).

FIG. 5 illustrates a computing device 500 comprising a processor 502 and memory 504. The memory 504 may be considered to comprise a non-transitory computer-readable medium comprising instructions. The instructions, when executed, cause the processor 502 of the computing device 500 to authenticate, using a first key, control instructions to be run in a memory of the computing device in step 506. The instructions, when executed, cause the processor 502 to receive, from a trusted source, an indication of a second key to be stored in the memory in step 508. The trusted source may be, for example, an external memory providing the indication of the second key which has been validated as being a trusted indication. The instructions, when executed, cause the processor 502 to immutably store the second key in the memory in step 510. The first and second keys are to authenticate the control instructions to be run in a memory of the computing device according to respective first and second cryptographic protocols.

The non-transitory computer-readable medium may comprise instructions that, when executed, cause the processor 502 of the computing device 500 to allow write access to the memory, to allow the second key to be immutably stored, in response to receipt of an authentication indicator indicating that the trusted source has verified the second authentication protocol associated with the second key is trusted. The instructions may, when executed, cause the processor 502 of the computing device 500 to disable write access to the memory following immutably storing the second key and prior to passing execution control to the control instructions. The second key may be a quantum-safe public cryptography key.

Examples disclosed herein may provide a mechanism that allows the design and deployment of crypto-agile RoT devices 100 that are able to speculatively implement one or more pre-standard quantum-safe crypto algorithms (e.g. LMS) with the ability to optionally enable that capability in the field at a later time on an as-needed basis. Examples disclosed herein may provide BIOS devices 100 with a way to determine the authenticity and integrity of updates (to provide further authentication keys 114) by using an algorithm (e.g. using LMS hash based signatures) that is not vulnerable to being defeated using quantum computing based algorithms.

Examples disclosed herein may mitigate against a chicken-vs-egg situation; that is, dependency is removed on a lack of secure code signing infrastructure for new quantum secure algorithms, that would otherwise force delaying hardware design (and release) until the signing infrastructure is in place.

Examples disclosed herein allow device manufacturers to phase in factory/field upgrades to allow use of quantum-safe control instruction authentication by devices using an update without introducing a new "attack surface" (i.e. a quantum-safe cryptographic signing functionality) on despatch of the device from the manufacturer.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features. The claims should not be construed to cover merely the foregoing examples, but also any variants which fall within the scope of the claims.

The following numbered paragraphs also form a part of this disclosure.

Paragraph 1. A computing device, comprising: a memory to store control instructions; and a processor to: perform a first authentication of the control instructions using a first key; and in response to receipt of a command to enable a second authentication of the control instructions, add a second key to a one-time programmable portion of the memory, wherein the command is signed using the first key, the second key to perform a second authentication of the control instructions with the first key to perform the first authentication of the control instructions.

Paragraph 2. The computing device of paragraph 1, to: receive the control instructions to be authenticated from an external memory.

Paragraph 3. The computing device of paragraph 1 or paragraph 2, to: when an update flag of the one-time programmable portion of the memory is set to a first value, perform the first authentication of the control instructions using the first key; in response to verifying the second authentication using at least the first key, set the update flag to a second value; and enable receipt of the command to enable the second authentication of the control instructions in response to the update flag set to the second value and add the second key to the one-time programmable portion of the memory.

Paragraph 4. The computing device of paragraph 3, to: when the update flag of the one-time programmable portion of the memory is set to the first value, block write access to the memory, and in response to verifying the second authentication, allow write access to the memory to allow the second key to be added to the one-time programmable portion of the memory.

Paragraph 5. The computing device of any of paragraphs 1 to 4, comprising: a ROM bootloader portion of the memory to store the first key and the control instructions; and the one-time programmable portion of the memory to store the second key.

Paragraph 6. The computing device of any of paragraphs 1 to 5, wherein the second key is a one-time signing key selected from a plurality of possible one-time signing keys of a hash-based signature scheme.

Paragraph 7. A computing device, comprising: a memory; and a processor to: store control instructions from an external memory into the memory; validate the control instructions using a first key; and execute the validated control instructions to enable the computing device to obtain a second key; wherein the first key is to provide a first authentication of the control instructions with the second key to provide a second authentication of control instructions.

Paragraph 8. The computing device of paragraph 7, wherein the control instructions from the external memory cause the computing device to store second authentication code, the second authentication code to perform the second authentication of the control instructions using the second key.

Paragraph 9. The computing device of paragraph 8, wherein the second authentication code comprises a header, wherein the header comprises: the second key; a first checking key; and a second checking key; and wherein the computing device is to verify the second authentication code by verifying a first key checking signature of the second authentication code using the first checking key and verifying a second key checking signature of the second authentication code using the second checking key prior to executing the validated control instructions to enable the computing device to obtain the second key.

Paragraph 10. The computing device of any of paragraphs 7 to 9, wherein the first checking key is to verify the second authentication code using a first verification protocol of the first key, and the second checking key is to verify the second authentication code using a second verification protocol of the second key.

Paragraph 11. The computing device of any of paragraphs 7 to 10, to: sign the second authentication code using a first signature generated using the first checking key and a second signature generated using the second checking key, the first and second signatures to verify the validity of the second authentication code prior to executing the validated control instructions to enable the computing device to obtain the second key.

Paragraph 12. A non-transitory computer-readable medium comprising instructions that, when executed, cause a processor of a computing device to: authenticate, using a first key, control instructions to be run in a memory of the computing device; receive, from a trusted source, an indication of a second key to be stored in the memory; and immutably store the second key in the memory, wherein the first and second keys are to authenticate the control instructions to be run in a memory of the computing device according to respective first and second cryptographic protocols.

Paragraph 13. The non-transitory computer-readable medium of paragraph 12, comprising instructions that, when executed, cause the processor of the computing device to: allow write access to the memory, to allow the second key to be immutably stored, in response to receipt of an authentication indicator indicating that the trusted source has verified the second authentication protocol associated with the second key is trusted.

Paragraph 14. The non-transitory computer-readable medium of paragraph 13, comprising instructions that, when executed, cause the processor of the computing device to: disable write access to the memory following immutably storing the second key and prior to passing execution control to the control instructions.

Paragraph 15. The non-transitory computer-readable medium of any of paragraphs 12 to 14, wherein the second key is a quantum-safe public cryptography key.

The invention claimed is:

1. A computing device, comprising:
   a memory comprising:
      a read-only memory (ROM) bootloader portion to store control instructions and a first key; and
      a one-time programmable portion; and
   a processor to:
      perform a first authentication of the control instructions using the first key;
      in response to receipt of a command to enable a second authentication of the control instructions, add a second key to the one-time programmable portion of the memory, wherein the command is signed using the first key; and
      use the second key to perform a second authentication of the control instructions.

2. The computing device of claim 1, wherein the processor is to receive the control instructions from an external memory.

3. The computing device of claim 1, wherein the processor is to:
   when an update flag of the one-time programmable portion of the memory is set to a first value, perform the first authentication of the control instructions using the first key;

in response to verifying the second authentication using the first key, set the update flag to a second value;

enable receipt of the command to enable the second authentication of the control instructions in response to the update flag set to the second value; and add the second key to the one-time programmable portion of the memory.

4. The computing device of claim 3, wherein the processor is to:

when the update flag of the one-time programmable portion of the memory is set to the first value, block write access to the memory; and in response to verifying the second authentication, allow write access to the memory to allow the second key to be added to the one-time programmable portion of the memory.

5. The computing device of claim 1, wherein the second key is a one-time signing key selected from a plurality of possible one-time signing keys of a hash-based signature scheme.

6. The computing device of claim 1, wherein the second key is associated with a quantum-safe cryptographic protocol.

7. The computing device of claim 6, wherein the quantum-safe cryptographic protocol comprises a Leighton-Micali Signature (LMS) scheme or an extended Merkle Signature Scheme (XMSS).

8. A computing device, comprising:

a memory comprising:

a read-only memory (ROM) bootloader portion to store control instructions and a first key; and a one-time programmable portion; and a processor to:

perform a first authentication of the control instructions using the first key;

after performing the first authentication of the control instructions, execute the control instructions to enable the computing device to obtain a second key; wherein store the second key in the one-time programmable portion of the memory; and perform a second authentication of the control instructions using the second key.

9. The computing device of claim 8, wherein the processor is to:

execute the control instructions to enable the computing device to obtain a second authentication code;

store the second authentication code in the memory; and use the second authentication code to perform the second authentication.

10. The computing device of claim 9, wherein:

the second authentication code comprises a header, the header comprising:

the second key;

a first checking key; and a second checking key; and prior to enabling the computing device to obtain the second key, the processor is to verify the second authentication code by:

verifying a first key checking signature of the second authentication code using the first checking key; and verifying a second key checking signature of the second authentication code using the second checking key.

11. The computing device of claim 10, wherein;

the first checking key is to verify the second authentication code using a first verification protocol of the first key; and the second checking key is to verify the second authentication code using a second verification protocol of the second key.

12. The computing device of claim 11, wherein the processor is to:

sign the second authentication code using a first signature generated using the first checking key; and sign the second authentication code using a second signature generated using the second checking key; and use the first signature and the second signature to verify validity of the second authentication code prior to enabling the computing device to obtain the second key.

13. The computing device of claim 8, wherein the second key is associated with a quantum-safe cryptographic protocol.

14. The computing device of claim 8, wherein the second key is associated with a Leighton-Micali Signature (LMS) scheme or an extended Merkle Signature Scheme (XMSS).

15. A non-transitory computer-readable medium comprising instructions that, when executed by a processor of a computing device, cause the computing device to:

perform a first authentication of control instructions received from an external memory using a first key stored in a read-only memory (ROM) bootloader portion of a memory of the computing device and using a first cryptographic protocol;

receive, from a trusted source, a second key;

store the second key in a one-time programmable portion of the memory; and perform a second authentication of the control instructions using the second key and using a second cryptographic protocol.

16. The non-transitory computer-readable medium of claim 15, wherein the instructions, when executed by the processor, cause the computing device to:

allow write access to the memory, to allow the second key to be stored in the one-time programmable portion of the memory, in response to receipt of an authentication indicator indicating that the trusted source has verified the second cryptographic protocol.

17. The non-transitory computer-readable medium of claim 16, wherein the instructions, when executed by the processor, cause the computing device to:

disable write access to the memory after storing the second key in the one-time programmable portion of the memory.

18. The non-transitory computer-readable medium of claim 15, wherein the second key is a quantum-safe public cryptography key.

19. The non-transitory computer-readable medium of claim 18, wherein the second cryptographic protocol comprises a quantum-safe cryptographic protocol.

20. The non-transitory computer-readable medium of claim 18, wherein the second cryptographic protocol comprises a Leighton-Micali Signature (LMS) scheme or an extended Merkle Signature Scheme (XMSS).

* * * * *